United States Patent [19]

Yakymyshyn et al.

[11] Patent Number: 5,094,553
[45] Date of Patent: Mar. 10, 1992

[54] OPTICAL WAVEGUIDES AND METHOD FOR THEIR FABRICATION

[75] Inventors: Christopher P. Yakymyshyn, Saratoga Springs; Eugene P. Boden, Scotia; Peter D. Phelps; Kevin R. Stewart, both of Schenectady, all of N.Y.

[73] Assignee: General Electric Company, Schenectady, N.Y.

[21] Appl. No.: 618,807

[22] Filed: Nov. 28, 1990

[51] Int. Cl.$^5$ .................................................. G02B 6/16
[52] U.S. Cl. ..................................... 385/122; 359/900; 385/123; 385/141
[58] Field of Search ......................... 307/425–430; 350/96.10, 96.12, 96.15, 96.29, 96.30–96.34, 320

[56] References Cited

U.S. PATENT DOCUMENTS 4,647,330 3/1987 Rand .......................... 350/96.10 X
4,784,716 11/1988 Rand et al. ................. 350/96.29 X
4,909,598 3/1990 Ninomiya et al. .............. 350/96.34

OTHER PUBLICATIONS

Marder et al., Science, 245, 626–628 (1989).

Primary Examiner—John D. Lee
Attorney, Agent, or Firm—William H. Pittman; James C. Davis, Jr.

[57] ABSTRACT

Optical waveguides comprise as core and cladding materials a chemical compound in two different crystalline forms with different indices of refraction. Preferably, the non-linear form is anhydrous and the linear form is a hydrate thereof, whereupon the core material can be prepared by selective heating of the cladding material as by a laser beam. A preferred compound is 4'-dimethylamino-4-methylstilbazolium p-toluenesulfonate.

5 Claims, No Drawings

OPTICAL WAVEGUIDES AND METHOD FOR THEIR FABRICATION

This invention relates to optical waveguides, and more particularly to waveguides employing chemical compounds with second order non-linear optical properties.

Developments in the field of non-linear optics hold promise for applications in such areas as optical information processing, telecommunications, laser utility optimization and non-linear analytical spectroscopy. Optical waveguides are employed in various types of apparatus useful in this field, including integrated optical circuits, optical modulators and optical switches. The waveguides have typically been manufactured by depositing a cladding material on a substrate, patterning and etching said cladding material to provide the channels desired for light transmission, and filling said channels with a light-transmitting core material having a higher index of refraction than the cladding material. Such patterning and etching procedures are expensive and burdensome. It would be desirable to provide a simpler method for the production of optical waveguides.

The present invention provides optical waveguides whose light transmitting properties are based on different crystalline structures of the same chemical compound. One such structure, employed as the core material, has second order non-linear optical properties, being asymmetric and having a high degree of electron delocalization and a relatively low energy difference between the ground and first excited states. The other structure has a lower index of refraction than the first structure, whereby it is capable of serving as a cladding material.

Thus, it is possible for the core and the cladding material to comprise the same substance in different crystalline forms. It is further possible in many instances to produce the core material by selective application of heat to the cladding material—for example, by laser writing.

In one of its aspects, therefore, the invention is an optical waveguide comprising a light-transmitting core comprising a chemical compound in an optically second order non-linear form and a cladding material partially or entirely enclosing said core, said cladding material comprising said chemical compound in a different form having a lower index of refraction than the core; said cladding material being readily convertible to the core material.

The chemical compounds useful as core materials in the waveguides of this invention are characterized by a substantially planar and highly electron-delocalized molecular structure, widely separated electropositive and electronegative groups and a highly ionic nature. Thus, anions and cations form separate, alternating layers in the crystalline structure, with either the anionic or the cationic layers having chromophoric properties and being isolated from each other by layers of the opposite polarity. Moreover, the chromophoric ions are oriented head-to-tail or otherwise asymmetrically.

Said compounds must also exist a crystalline form having a lower index of refraction than the core material. In preferred embodiments, the inactive form is a hydrate of the active form, the two forming distinct crystalline phases.

A compound which has been found to have these properties is 4'-dimethylamino-4-methylstilbazolium p-toluenesulfonate, having the formula

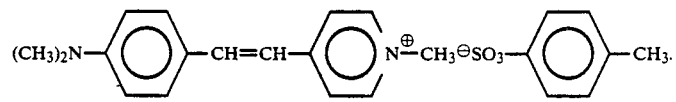

This compound, hereinafter sometimes designated "DAST", in its previously known anhydrous form exists as green monoclinic Cc crystals. It has indices of refraction $n_a$, $n_b$ at 820 nm. of 2.29 and 1.66 and at 633 nm. of 3.38 and 1.93, respectively, as well as a powder second harmonic generation efficiency 1000 times that of urea; reference is made to Marder et al., *Science*, 245, 626-628 (1989).

It has now been found that DAST also forms an optically linear, centrosymmetric orange hydrate which crystallizes in a triclinic $P\bar{1}$ phase with indices of refraction $n_a$, $n_b$ at 820 nm. of 2.20 and 1.55 and at 633 nm. of 2.46 and 1.59, respectively. Said hydrate is free from second order non-linear optical properties. It is disclosed and claimed in copending, commonly owned application Ser. No. 07/618,809.

Upon heating, said hydrate is readily converted to the anhydrous, optically non-linear form. In a preferred embodiment of the invention, therefore, the core is the optically non-linear, anhydrous form of DAST, preferably in single crystal form, and the cladding material is the optically linear hydrate thereof.

DAST in its anhydrous form is conveniently prepared by the reaction of methyl p-toluenesulfonate with 4-picoline (4-methylpyridine) followed by condensation with p-dimethylaminobenzaldehyde, using a lower alkanol as solvent. The hydrated form may be obtained by dissolving the anhydrous compound in water or in a suitable organic solvent (e.g., methanol or dimethyl sulfoxide) containing at least about 5% water by volume, and growing a crystal by conventional means.

The anhydrous form crystallizes in platelets with mirror-like parallel facets constituting alternate cation and anion layers. The chromophores in neighboring sheets form a "herringbone" pattern. This compound is very thermally stable, showing no apparent change in optical properties upon heating for 200 hours in air at 160° C.

Analysis of the hydrated form by thermogravometric means and differential scanning calorimetry shows that it corresponds generally to the monohydrate. The unit cell thereof, upon examination by X-ray diffraction, clearly shows the centrosymmetric ordering of the chromophore around the water molecule. Transition between the hydrate and the anhydrous form takes place upon heating at a temperature in the range of about 110°-145° C.

The optical waveguides of this invention may be produced by depositing a film of hydrated DAST, preferably in single crystal form, on a suitable substrate and heating a selected region thereof to produce the anhydrous compound in single crystal form, said anhydrous compound serving as the core. This method is another aspect of the invention.

The substrates employed in the method of this invention are conventional and their nature will be readily apparent to those skilled in the art; exemplary materials are silicon, gallium arsenide, fused silica, polyimides and polymethacrylates. Any of the above substrates may also be metallized for employment in the invention.

Deposition of the hydrated DAST on the substrate may be conducted as described hereinabove. For its conversion in the selected region to the anhydrous, optically non-linear form, any suitable local heating method may be employed. It is frequently convenient to use a laser beam of predetermined diameter, typically about 20-70 microns.

It is frequently found that the anhydrous DAST formed in the localized heating region is polycrystalline rather than in single crystal form. If desired, it may be converted to single-crystal material by art-recognized operations such as annealing. Alternatively, the scanning rate with the laser may be regulated to produce the single crystal anhydrous DAST.

The invention is illustrated by the following examples.

EXAMPLE 1

A two-liter flask equipped with a condenser and magnetic stirrer was charged with one liter of ethanol, 46.5 grams (1 equivalent) of 4-picoline and 93 grams (1 equivalent) of methyl p-toluenesulfonate. The mixture was heated under reflux for 1 hour, after which there were added 90 grams (1.1 equivalents) of dimethylaminobenzaldehyde followed by 10 ml. (0.2 equivalent) of piperidine. The deep red reaction mixture was heated under reflux for 3.5 hours and cooled to room temperature, whereupon dark green crystals precipitated. They were removed by filtration, washed repeatedly with ether and dried under vacuum. The yield was 185 grams (88% of theoretical) of a compound shown by proton nuclear magnetic resonance spectroscopy to be the desired 4'-dimethylamino-4-methylstilbezolium p-toluenesulfonate.

EXAMPLE 2

A solution of 9.2 grams of anhydrous DAST in 500 ml. of water was heated to reflux and cooled, whereupon long orange needles formed; they were collected by filtration, washed with water and then acetone, and dried at room temperature under vacuum. The product was the desired DAST hydrate; its yield was 8.6 grams (90% of theoretical).

EXAMPLE 3

The DAST hydrate of Example 2 was placed in a 250 ml. flask and gently heated with a hot air gun while slowly rotating the flask on a rotary evaporator. The crystals turned green as heating was continued. In a separate experiment, the weight loss as measured by thermogravimetric analysis was found to be 4.12%, as compared with the theoretical value of 4.11% for the monohydrate.

EXAMPLE 4

To a saturated solution of anhydrous DAST in methanol was added water in the amount of 5% by volume. The methanol was allowed to evaporate slowly, whereupon large single crystals of the hydrate formed.

One of these single crystals was placed on a glass slide and a line was drawn therein using a 50-milliwatt argon ion laser at 488-514 nm. and 1 cm./sec. A 25- to 50-micron laser spot was used and the line thus written in the hydrated material had a width of 10 microns. Said line was found to be polycrystalline anhydrous DAST. It could be converted upon annealing to the single crystal form.

What is claimed is:

1. An optical waveguide comprising a light-transmitting core comprising a chemical compound in a first crystalline form having optically second order non-linear properties and a cladding material partially or entirely enclosing said core, said cladding material comprising said chemical compound in a different crystalline form having a lower index of refraction than the core; said cladding material being readily convertible to the core material.

2. A waveguide according to claim 1 wherein the cladding material is a hydrate of said compound.

3. A waveguide according to claim 2 wherein said compound is 4'-dimethylamino-4-methylstilbazolium p-toluenesulfonate.

4. A waveguide according to claim 3 wherein the core is in single crystal form.

5. A method for producing an optical waveguide which comprises depositing a film of hydrated 4'-dimethylamino-4-methylstilbazolium p-toluenesulfonate on a substrate as a cladding material and heating a selected region thereof to produce the anhydrous compound in single crystal form as the core.

* * * * *